(12) United States Patent
Gossett et al.

(10) Patent No.: US 6,803,920 B2
(45) Date of Patent: Oct. 12, 2004

(54) METHOD AND APPARATUS FOR DIGITAL IMAGE SEGMENTATION USING AN ITERATIVE METHOD

(75) Inventors: Phil Gossett, Mountain View, CA (US); Edward Ratner, Sunnyvale, CA (US)

(73) Assignee: PTS Corporation, San Jose, CA (US)

( * ) Notice: Subject to any disclaimer, the term of this patent is extended or adjusted under 35 U.S.C. 154(b) by 651 days.

(21) Appl. No.: 09/919,671

(22) Filed: Jul. 31, 2001

(65) Prior Publication Data

US 2003/0002732 A1 Jan. 2, 2003

Related U.S. Application Data

(60) Provisional application No. 60/222,834, filed on Aug. 4, 2000.

(51) Int. Cl.[7] ................................................. G09G 5/02
(52) U.S. Cl. ....................................... 345/591; 382/164
(58) Field of Search ................................ 345/589, 591, 345/593, 597, 598; 382/164, 171, 173

(56) References Cited

U.S. PATENT DOCUMENTS 5,684,895 A    11/1997  Harrington
5,786,823 A     7/1998  Madden et al.
5,864,342 A     1/1999  Kajiya et al.
6,141,442 A  * 10/2000  Chen ........................... 382/164

FOREIGN PATENT DOCUMENTS

WO    PCT/US01/24318    10/2001

* cited by examiner

*Primary Examiner*—Matthew Luu
(74) *Attorney, Agent, or Firm*—Okamoto & Benedicto LLP (57) ABSTRACT

A digital image is divided into segments, wherein the digital image comprises an array of pixels each having a pixel location and a pixel color value. A method comprises obtaining an image frame comprising an array of pixels each having a pixel color value, assigning an initial segment identifier to each pixel in the image frame independent of each pixel's pixel color value, testing, using an appropriateness test, pixels for possible reassignment from a current segment to a neighboring segment, and if the appropriateness test indicates a pixel should be reassigned, reassigning the segment identifier of the pixel.

11 Claims, 15 Drawing Sheets

METHOD AND APPARATUS FOR DIGITAL IMAGE SEGMENTATION USING AN ITERATIVE METHOD

CROSS-REFERENCES TO RELATED APPLICATIONS

The present disclosure is related to the following:

U.S. Pat. No. 6,600,786 [U.S. patent application Ser. No. 09/550,705, filed Apr. 17, 2000 and entitled "Method and Apparatus for Efficient Video Processing"] (hereinafter "Prakash I").

U.S. Pat. No. 6,778,698 [U.S. patent application Ser. No. 09/591,438, filed Jun. 9, 2000 and entitled "Method and Apparatus for Digital Image Segmentation"] (hereinafter "Prakash II").

The present disclosure claims priority from:

U.S. Provisional Patent Application No. 60/222,834, filed Aug. 4, 2000 and entitled "Grid-Based Segmentation."

The disclosures of each of the above are hereby incorporated by reference for all purposes.

BACKGROUND OF THE INVENTION

Image segmentation is the process of partitioning an image into a set of non-overlapping parts, or segments, that together constitute the entire image. Image segmentation is useful for many applications, one of which is compression. For example, it is well known that if an image made up of pixels with the image represented by pixel color values for each of the pixels, the image representation can be compressed if contexts for the pixels can be extracted and used in representing the pixel color values. Thus, if a pixel color value can be one of 256 color values, it can be represented by eight bits, but if a pixel color value is more likely to be a given color value in view of surrounding color values (e.g., in many images, a pixel surrounded by a field of blue pixels is likely to be a blue pixel), then those pixel color values can be represented, on average, in fewer than eight bits. Compression results are likely to be improved if the pixels used for context are actually the context of the pixel being compressed and not pixels that are independent of the pixel being compressed.

Segmentation is helpful in determining which pixels are likely to be related enough to other pixels such that related pixels are used for context with more weight than unrelated pixels. While segmentation is useful for compression, segmentation is also useful for other applications, some of which are mentioned here. For example, a computer program that is not doing compression might process each segment of an image in a manner specific to that segment or associate different data, such as labels, with different segments. In any case, correctly segmenting the image is important for proper operation of the process being performed on the image.

As the terms are used herein, an image is an array of pixel color values such that pixels placed in an array and colored according to each pixel's color value would represent the image. Each pixel has a location and can be thought of as being a point at that location or as a shape that fills the area around the pixel such that any point within the image is considered to be "in" a pixel's area or considered to be part of the pixel. The image itself might be a multidimensional pixel array on a display, on a printed page, an array stored in memory, or a data signal being transmitted and representing the image. The multidimensional pixel array can be a two-dimensional array for a two-dimensional image, a three-dimensional array for a three-dimensional image, or some other number of dimensions.

The image can be an image of a physical space or plane or an image of a simulated and/or computer-generated space or plane. In the computer graphic arts, a common image is a two-dimensional view of a computer-generated three-dimensional space (such as a geometric model of objects and light sources in a three-space). An image can be a single image or one of a plurality of images that, when arranged in a suitable time order, form a moving image, herein referred to as a video sequence.

When an image is segmented, the image is represented by a plurality of segments. The degenerate case of a single segment comprising the entire image is within the definition of segment used here, but the typical segmentation divides an image into at least two segments. In many images, the segmentation divides the image into a background segment and one or more foreground segments.

In one segmentation method, an image is segmented such that each segment represents a region of the image where the pixel color values are more or less uniform within the segment, but dramatically change at the edges of the image. In that implementation, the regions are connected, i.e., it is possible to move pixel-by-pixel from any one pixel in the region to any other pixel in the region without going outside the region.

Pixel color values can be selected from any number of pixel color spaces. One color space in common use is known as the YUV color space, wherein a pixel color value is described by the triple (Y, U, V), where the Y component refers to a grayscale intensity or luminance, and U and V refer to two chrominance components. The YUV color space is commonly seen in television applications. Another common color space is referred to as the RGB color space, wherein R, G and B refer to the Red, Green and Blue color components, respectively. The RGB color space is commonly seen in computer graphics representations, along with CYMB (cyan, yellow, magenta, black) often used with computer printers.

Figure 1:
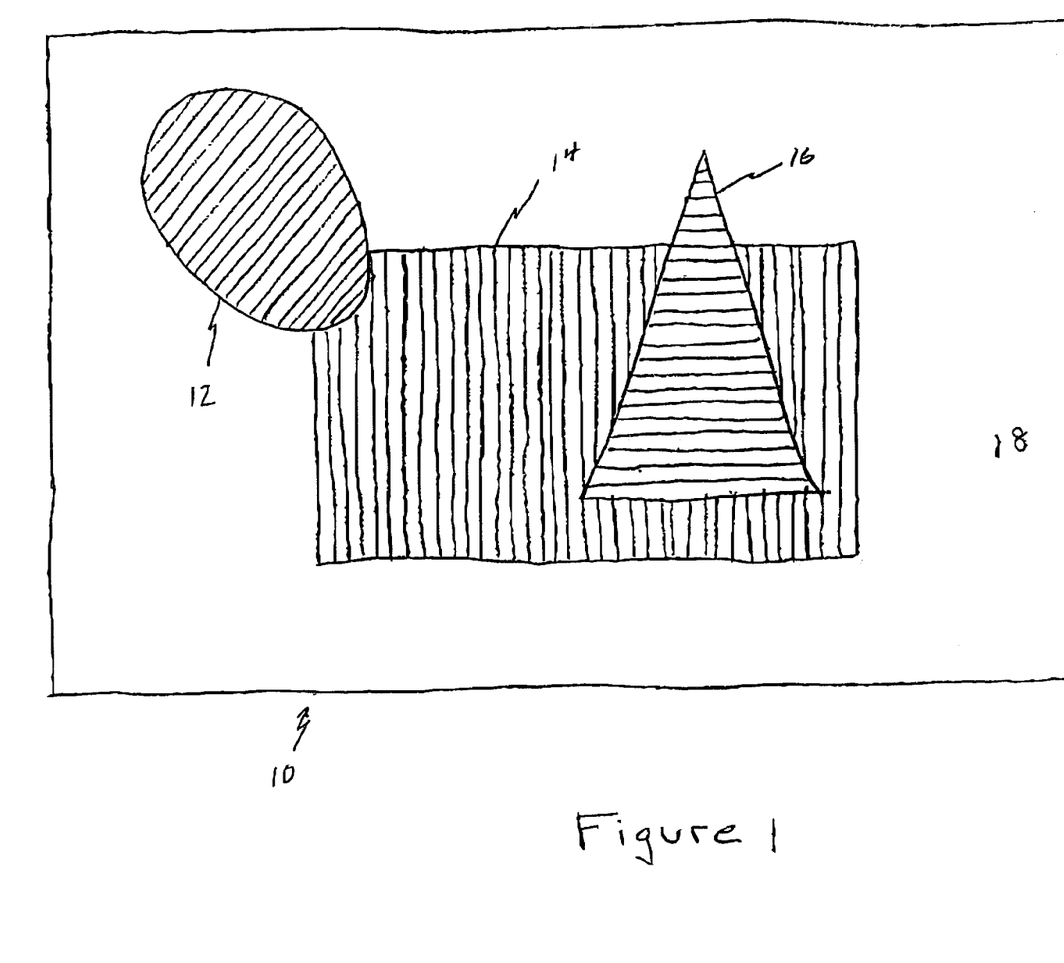
FIG. 1 illustrates an example of a digital image segmentation.

An example of image segmentation is illustrated in FIG. 1. There, an image frame 10 contains an oval 12, a rectangle 14 and a triangle 16 on a background 18. The image can be segmented into segments based on colors (the shading of the oval 12 in FIG. 1 represents a color distinct from the colors of the rectangle 14, the triangle 16 or the background 18). Thus, the oval 12, the rectangle 14, the triangle 16 and the background 18 are segmented into separate segments in this example.

In this example, if each segment has a very distinct color and the objects in the image 10 end cleanly at pixel boundaries, segmentation is a simple process. In general, however, generating accurate image segments is a difficult problem and there is much open research on this problem, such as in the field of "computer vision" research. One reason segmentation is often difficult is that a typical image includes noise introduced from various sources including, but not limited to, the digitization process when the image is captured by physical devices and the image also includes regions that do not have well-defined boundaries.

There are several ways of approaching the task of image segmentation, which can generally be grouped into the following: 1) histogram-based segmentation; 2) traditional edge-based segmentation; 3) region-based segmentation; and 4) hybrid segmentation, in which several of the other approaches are combined. Each of these approaches is described below.

1. Histogram-Based Segmentation

Segmentation based upon a histogram technique relies on the determination of the color distribution in each segment. This technique uses only one color plane of the image, typically an intensity color plane (also referred to as the greyscale portion of the image), for segmentation. To perform the technique a processor creates a histogram of the pixel color values in that plane. A histogram is a graph with a series of "intervals" each representing a range of values arrayed along one axis and the total number of occurrences of the values within each range shown along the other axis. The histogram can be used to determine the number of pixels in each segment, by assuming that the color distribution within each segment will be roughly a Gaussian, or bell-shaped, distribution and the color distribution for the entire image will be a sum of Gaussian distributions. Histogram-based techniques attempt to recover the individual Gaussian curves by varying the size of the intervals, i.e., increasing or decreasing the value range, and looking for high or low points. Once the distributions have been ascertained, the each pixel is assigned to the segment with its corresponding intensity range.

The histogram method is fraught with errors. The fundamental assumption that the color distribution is Gaussian is at best a guess, which may not be accurate for all images. In addition, two separate regions of identical intensity will be considered the same segment. Further, the Gaussian distributions recovered by the histogram are incomplete in that they cut off at the ends, thus eliminating some pixels. Further, this method of segmentation is only semi-automatic, in that the technique requires that the number of segments are previously known and that all of the segments are all roughly the same size.

2. Traditional Edge-Based Segmentation

Traditional edge-based segmentation uses differences in color or greyscale intensities to determine edge pixels that delineate various regions within an image. This approach typically assumes that when edge pixels are identified, the edge pixels will completely enclose distinct regions within the image, thereby indicating the segments. However, traditional edge detection techniques often fail to identify all the pixels that are in fact edge pixels, due to noise in images or other artifacts. If some edge pixels are missed, some plurality of distinct regions might be misidentified as being a single segment.

3. Region-Based Segmentation

Region based segmentation attempts to detect homogenous regions and designate them as segments. One class of region-based approaches starts with small uniform regions within the image and tries to merge neighboring regions that are of very close color value in order to form larger regions. Conversely, another class of region-based approaches starts with the entire image and attempts to split the image into multiple homogeneous regions. Both of these approaches result in the image being split at regions where some homogeneity requirements are not met.

The first class of region based segmentation approaches is limited in that the segment edges are approximated depending on the method of dividing the original image. A problem with the second class of region based approaches is that the segments created tend to be distorted relative to the actual underlying segments.

4. Hybrid Segmentation

The goal of hybrid techniques is to combine processes from multiple previous segmentation processes to improve image segmentation. Most hybrid techniques are a combination of edge segmentation and region-based segmentation, with the image being segmented using one of the processes and being continued with the other process. The hybrid techniques attempt to generate better segmentation than a single process alone. However, hybrid methods have proven to require significant user guidance and prior knowledge of the image to be segmented, thus making then unsuitable for applications requiring fully automated segmentation.

SUMMARY OF THE INVENTION

The present invention provides an exemplary method and apparatus for digital image segmentation. For example, in one embodiment, a plurality of segments are created from a digital image frame using grid-based segmentation.

Accordingly, in one embodiment, a digital image comprised of an array of pixels each having a pixel location and a pixel color value, is divided into regularly ordered segments. A method comprises obtaining an image frame, assigning an initial segment identifier to each pixel in the image frame independent of each pixel's color value, testing, using an appropriateness test, pixels for possible reassignment from a current segment to a neighboring segment, and if the appropriateness test indicates a pixel should be reassigned, reassigning the segment identifier of the pixel.

In another embodiment, a digital image is divided into segments, wherein the digital image comprises an array of pixels each having a pixel location and a pixel color value. A method comprises obtaining an image frame comprising an array of pixels each having a pixel color value, overlaying a logical grid over the image data such that initially each subsection of the grid encompasses at least two pixels, and adjusting the grid subsection boundaries to create at least one segment.

A further understanding of the nature and advantages of the inventions herein may be realized by reference to the remaining portions of the specification and the attached drawings.

DETAILED DESCRIPTION OF THE EMBODIMENTS

With reference to the exemplary drawings wherein like reference numerals indicate like or corresponding elements among the figures, embodiments of a system according to the present invention will now be described in detail. In one aspect, segmentation is used as an integral portion of a video delivery platform fully described in Prakash I and Prakash II.

Figure 2:
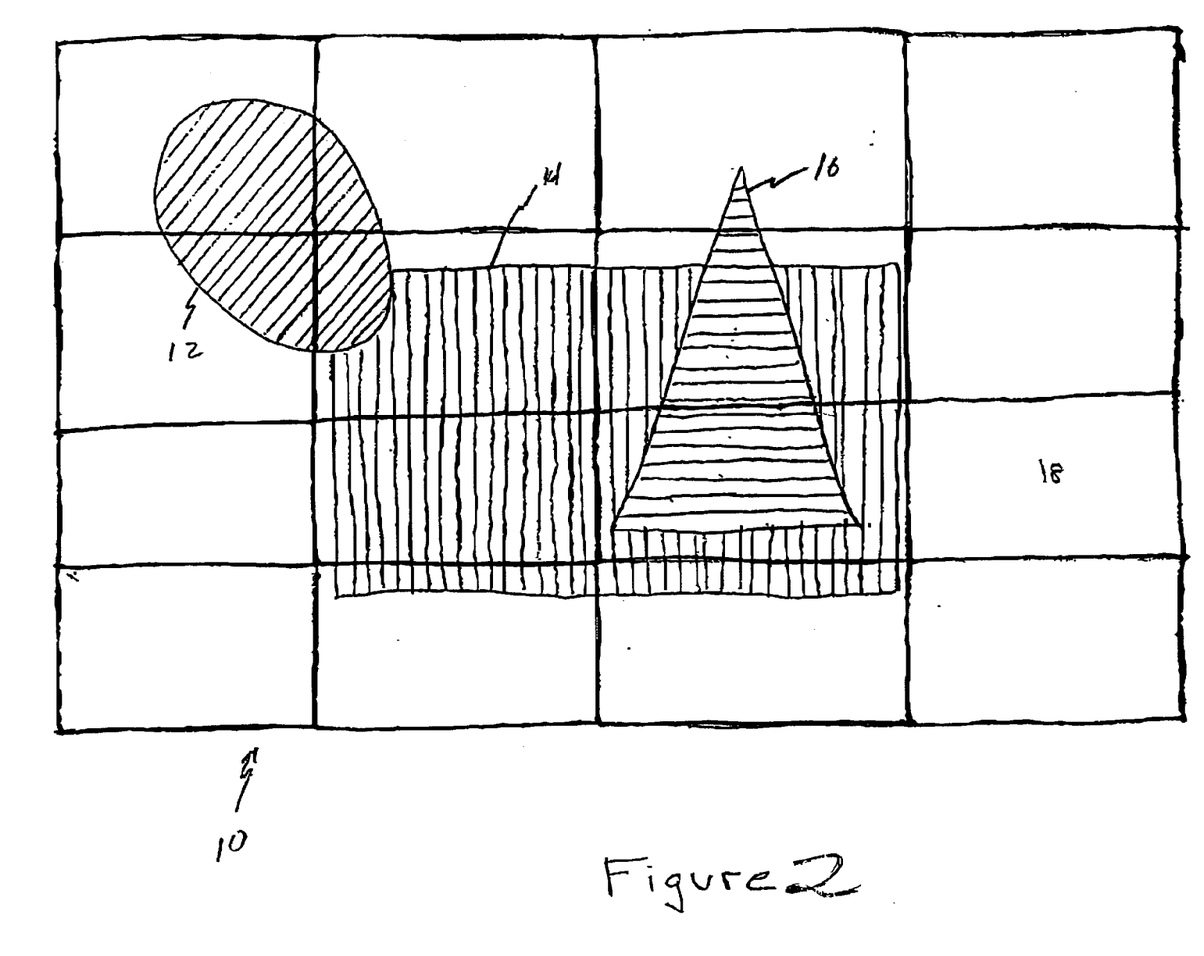
FIG. 2 illustrates an example of an overlaid grid.
Figure 3:
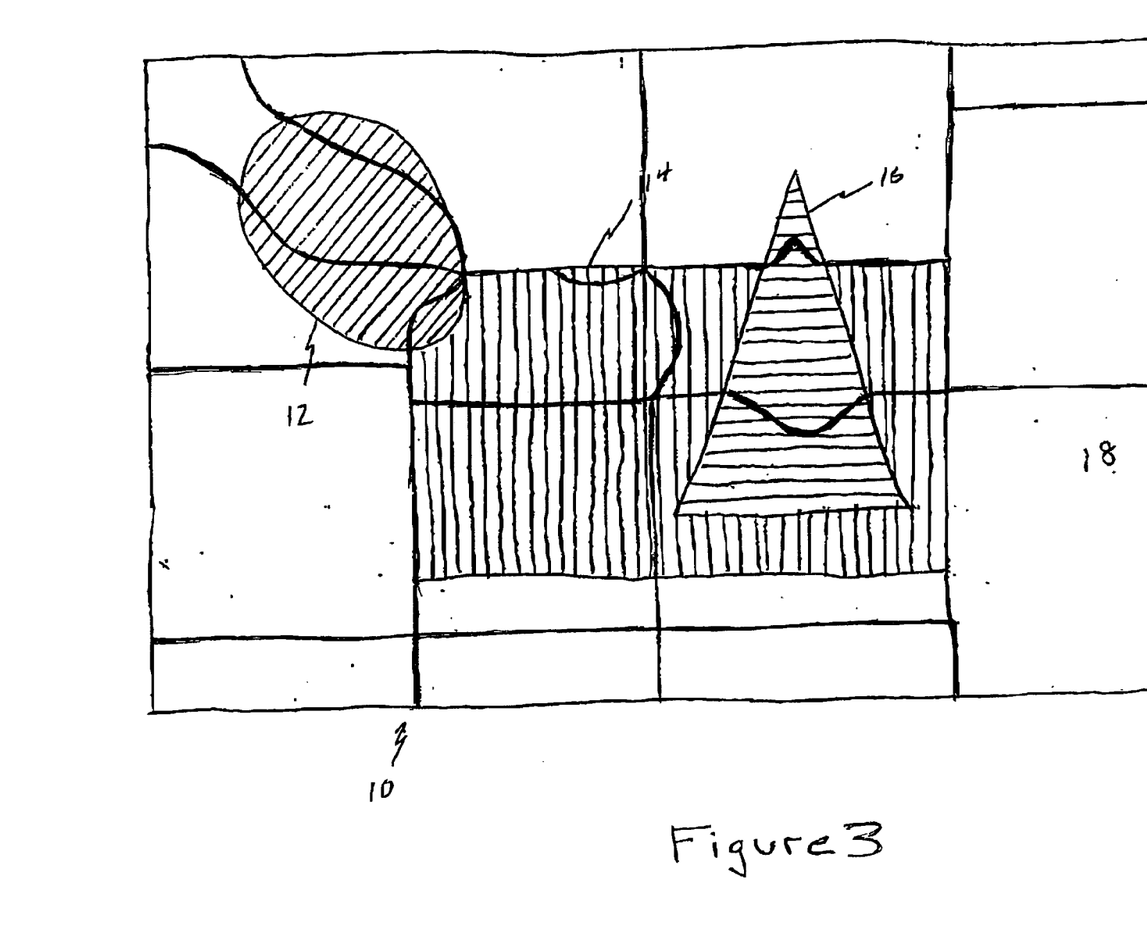
FIG. 3 illustrates an example of a partially adjusted overlaid grid.
Figure 4:
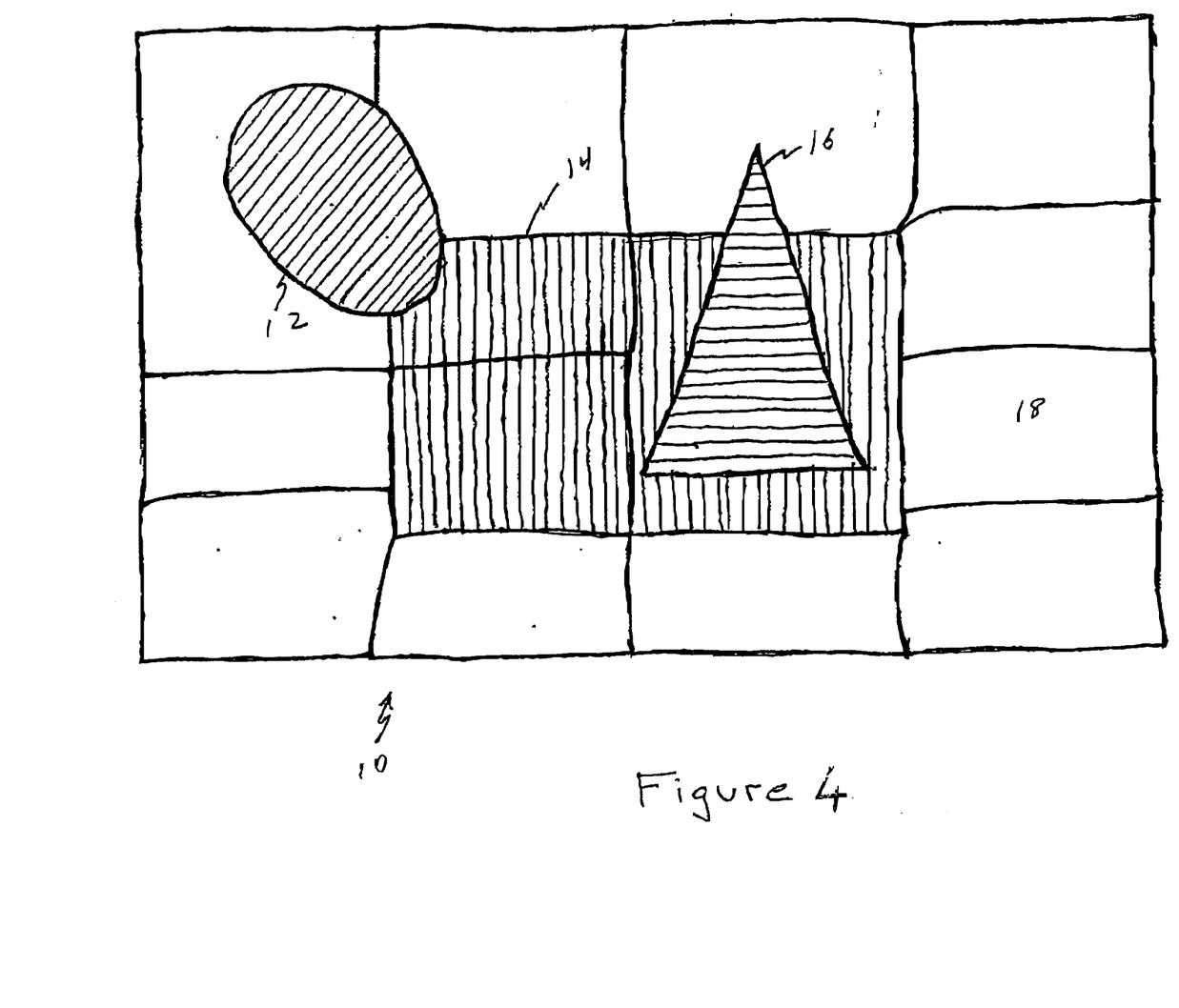
FIG. 4 illustrates an example of an adjusted overlaid grid.

Referring to FIGS. 2–4, one embodiment of a grid-based segmentation process is illustrated. A method and apparatus are provided for the creation of segments from a digital image. The method includes obtaining a digital image comprising an array of pixels, each pixel being described by a location, a color value and an initial segment identifier (i.e., something that indicates to which segment each pixel belongs).

A given digital frame is first divided into a grid of segments independent of the image contents. In one embodiment, the grid comprises a plurality of rectangles. For purposes of illustration, 16 rectangles are shown in FIG. 2; however, in practice the frame may be divided into any number of rectangles. For example, the frame may be divided into 2000 rectangles. A process is then applied, as described in more detail below, to adjust the boundaries of the grid rectangles based on the underlying pixel values.

FIG. 3 shows a partial adjustment of the boundaries and FIG. 4 shows a final adjustment of the boundaries such that the boundaries define segments and pixels within a given segment have substantially uniform color values. A segmentation mask is thus produced. It should be noted that a segmentation mask, also referred to as a logical mask or simply a mask for the purposes of this patent, can be of the shape of the initial grid or it can take on various different shapes. In one embodiment, the rectangles take on amorphous shapes by adjusting pixels on the boundaries one at a time, as will be described below.

Figure 5:
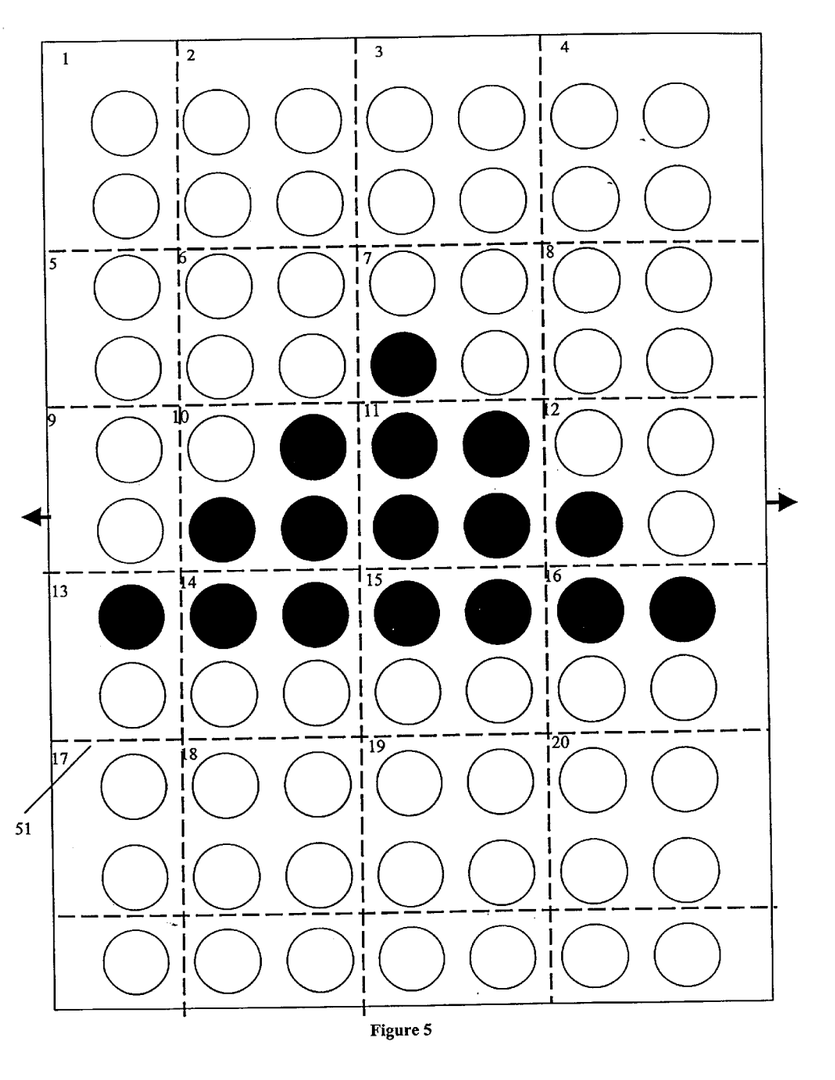
FIG. 5 is an image frame with an overlaid grid.

FIG. 5 illustrates a digital image comprising white and black image pixels. In one specific embodiment, white pixels have a value of 255, while black pixels have a value of 0. It should be noted that embodiments according to the present invention are not limited to black and white pixels, but may relate to pixels of varying colors.

A logical mask 51 is overlaid on the image. The logical mask divides the image frame into at least one image region and likely a plurality of image regions, the sum of which equals the original image frame.

In one embodiment, the boundaries of the logical mask exist between the image pixels. In another embodiment of the invention, some mask boundaries intersect pixels. The logical mask can be a grid or take on other arrangements. Within each subsection of the grid preferably at least two image pixels are initially contained. Each subsection is assigned a unique identifier, shown in the upper left corner of each subsection. Since each pixel is within a given subsection, each pixel has associated with it one of the unique identifiers. In one embodiment, the unique identifier is represented numerically. In embodiments where subsection boundaries can intersect pixels, those intersected pixels are assigned to one subsection according to a predefined rule. For example, a pixel might be assigned to the leftmost subsection it is at least partially in and to the upper subsection it is in when the pixel is intersected by a horizontal boundary.

Figure 6:
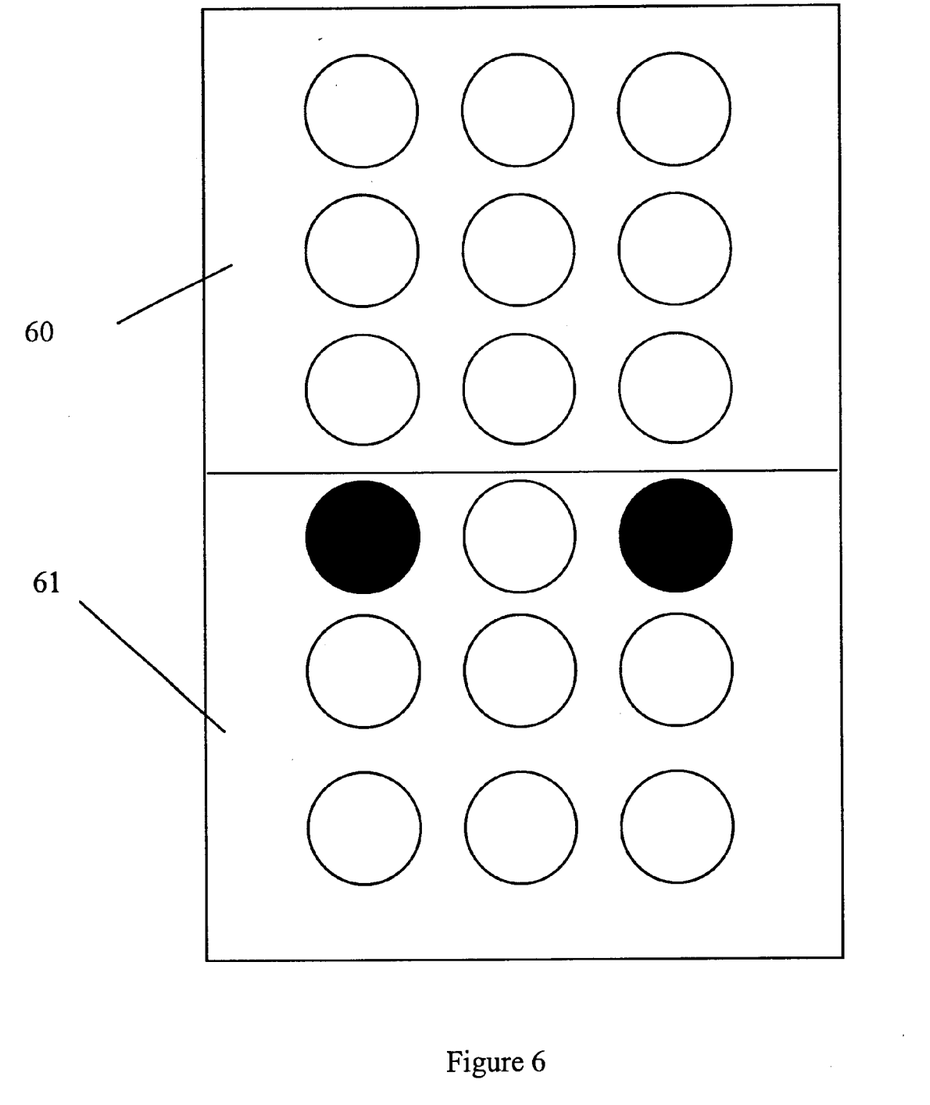
FIG. 6 illustrates two subsections and how average pixel values can be computed.

FIG. 6 illustrates how pixels are reassigned to different subsections. The illustration relates to two adjacent subsections, namely subsections 60 and 61. Subsection 60 comprises nine pixels, each having a pixel value of 255 (show as white pixels). Subsection 61 comprises two pixels having pixel values of 0 and seven having pixel values of 255 (shown as black pixels and white pixels, respectively).

In one embodiment, an image processor computes a representative value (median, average, etc.) of the pixel values in subsection 60. This average value is 255. Similarly, the average pixel value of subsection 61 is computed to be approximately 198. In this case, the black pixels (each having a value of 0) are not reassigned because 198 is closer to 0 than is 255.

In another embodiment, the image processor takes a representative value of the pixel values in subsections 60 and 61, which are sufficiently proximate to a border pixel to be considered.

Figure 7A:
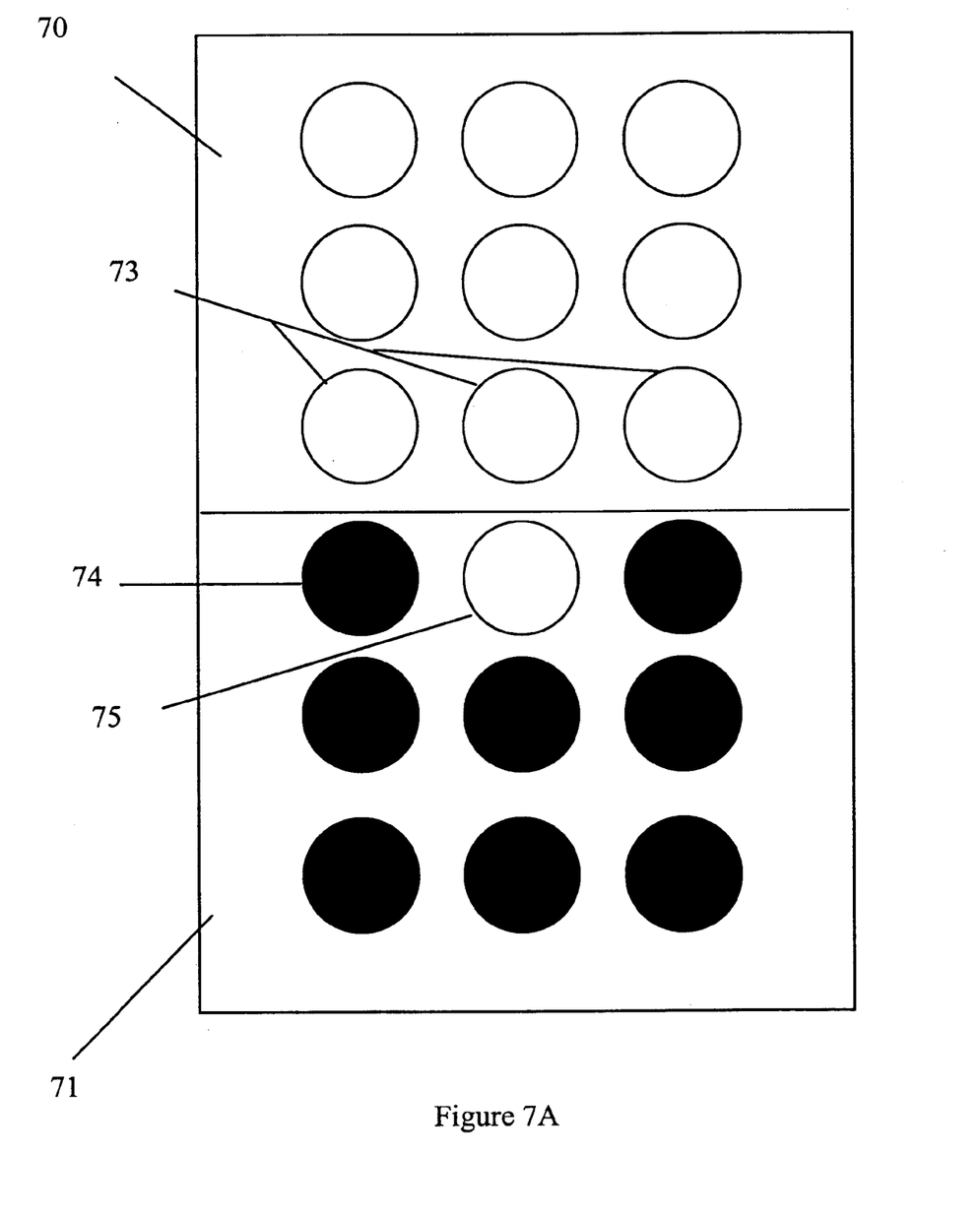
FIG. 7A illustrates border pixels which are to be considered for reassignment.

FIG. 7A illustrates border pixels which are to be considered for identifier reassignment. The white border pixels marked 73 each have a value of 255, which is closer to the average pixel value of subsection 70 than the average pixel value of subsection 71. Similarly, the black border pixels marked 74 each have a value of zero, which is closer to the average pixel value of subsection 71 than subsection 70. Thus pixels 73 and 74 retain their original subsection identifiers. However, pixel 75, a white pixel in subsection 71, has a value of 255, which is closer to the average values in subsection 70. Therefore, the segment identifier of pixel 75 is changed to reflect inclusion in subsection 70.

Figure 7B:
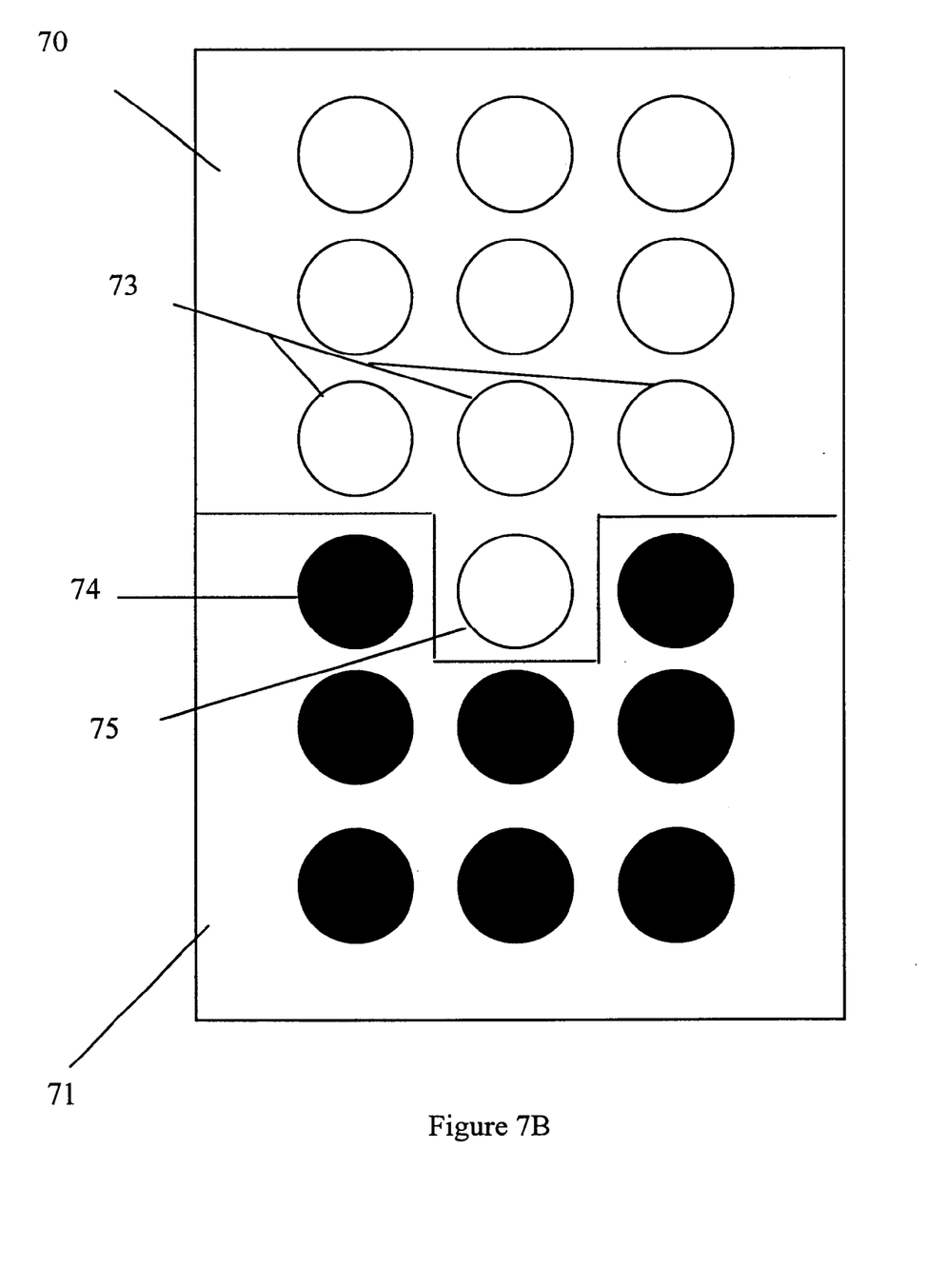
FIG. 7B illustrates a logical grid being changed in shape.

FIG. 7B illustrates the new shape of the logical mask. Pixel 75 is now within grid 70. This is repeated until the process converges, i.e., until the boundaries do not change in an adjustment pass over the image anymore or the boundaries change less than a threshold amount. These subsections are now known as segments.

Figure 8A:
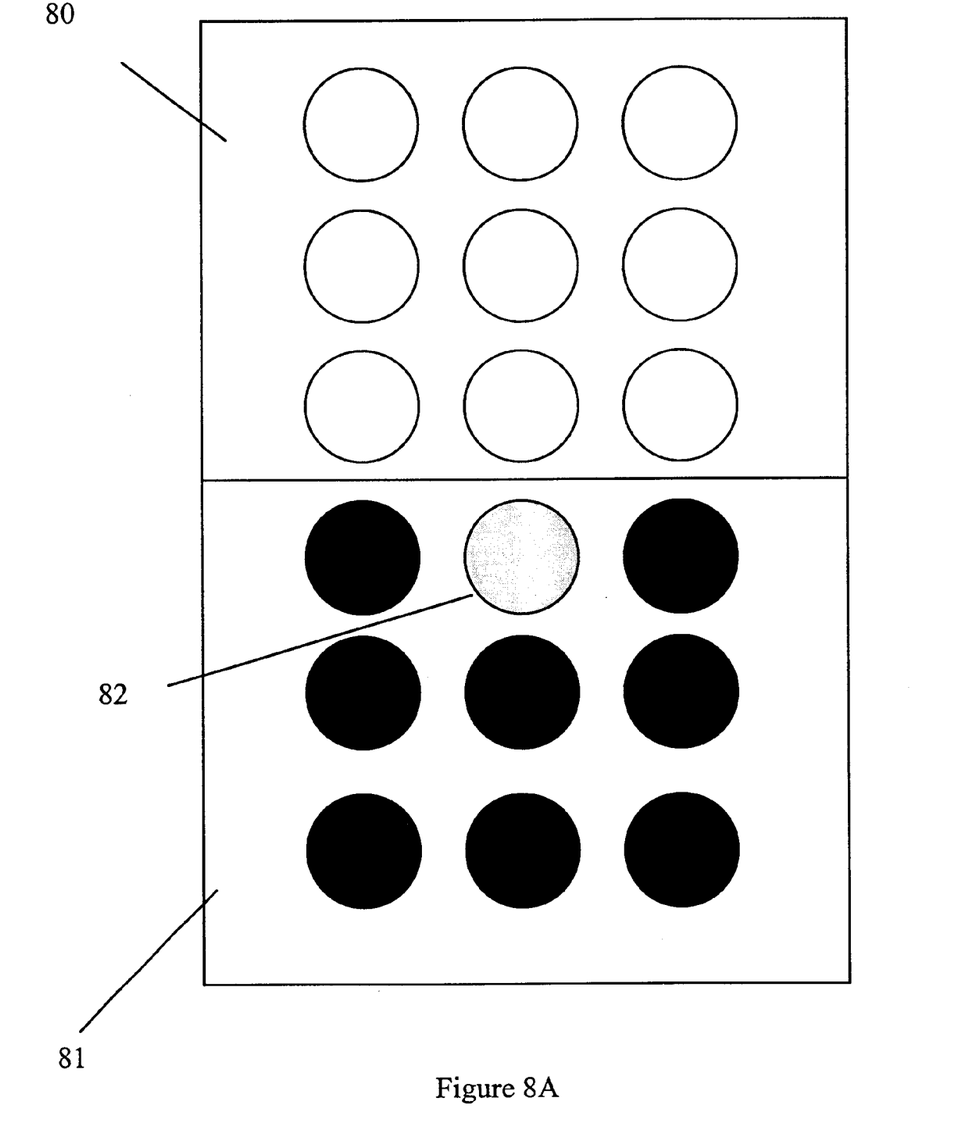
FIG. 8A illustrates a border pixel of intermediate value
Figure 8B:
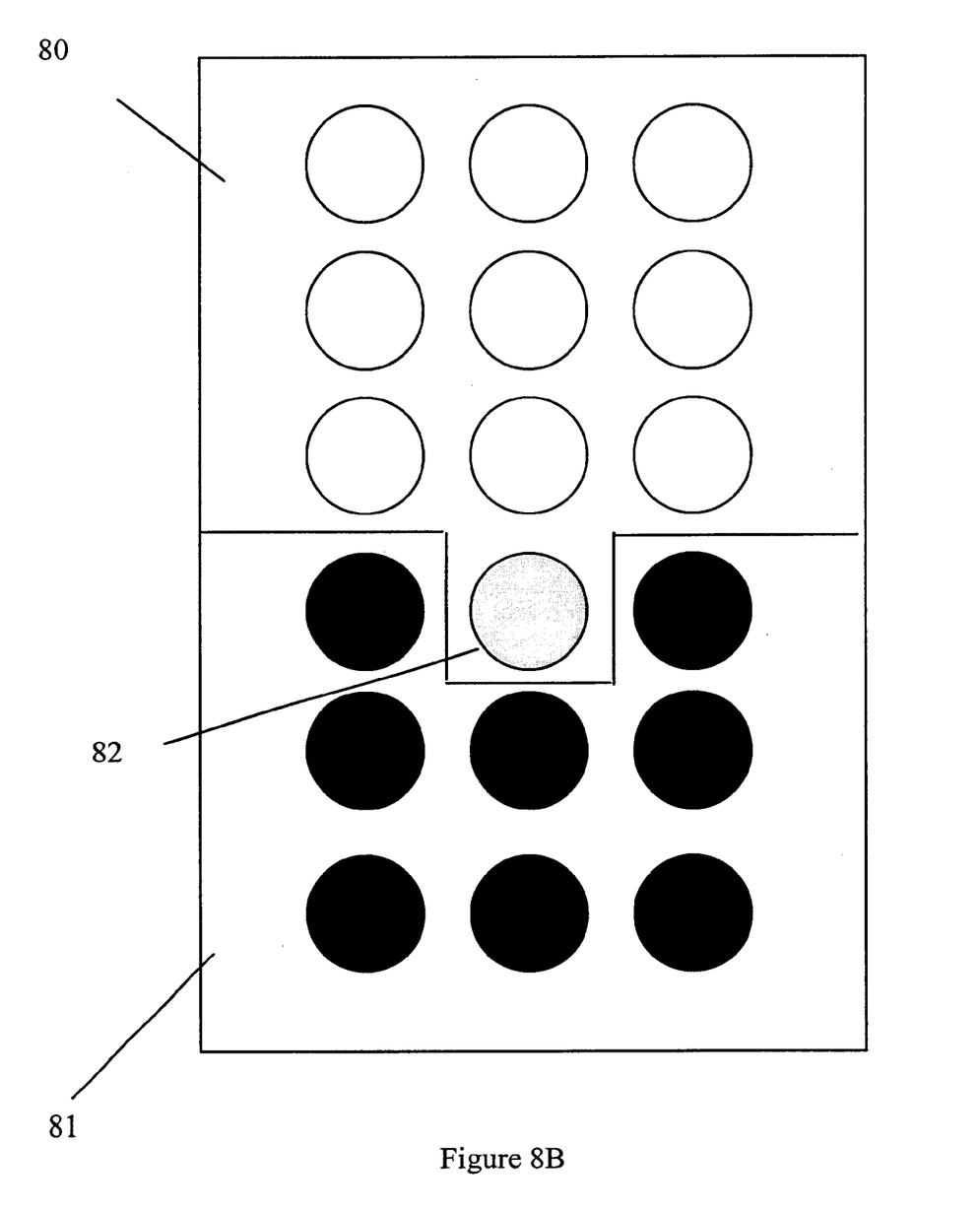
FIG. 8B illustrates a logical grid being changed in shape due to inclusion of a border pixel of intermediate value
Figure 8C:
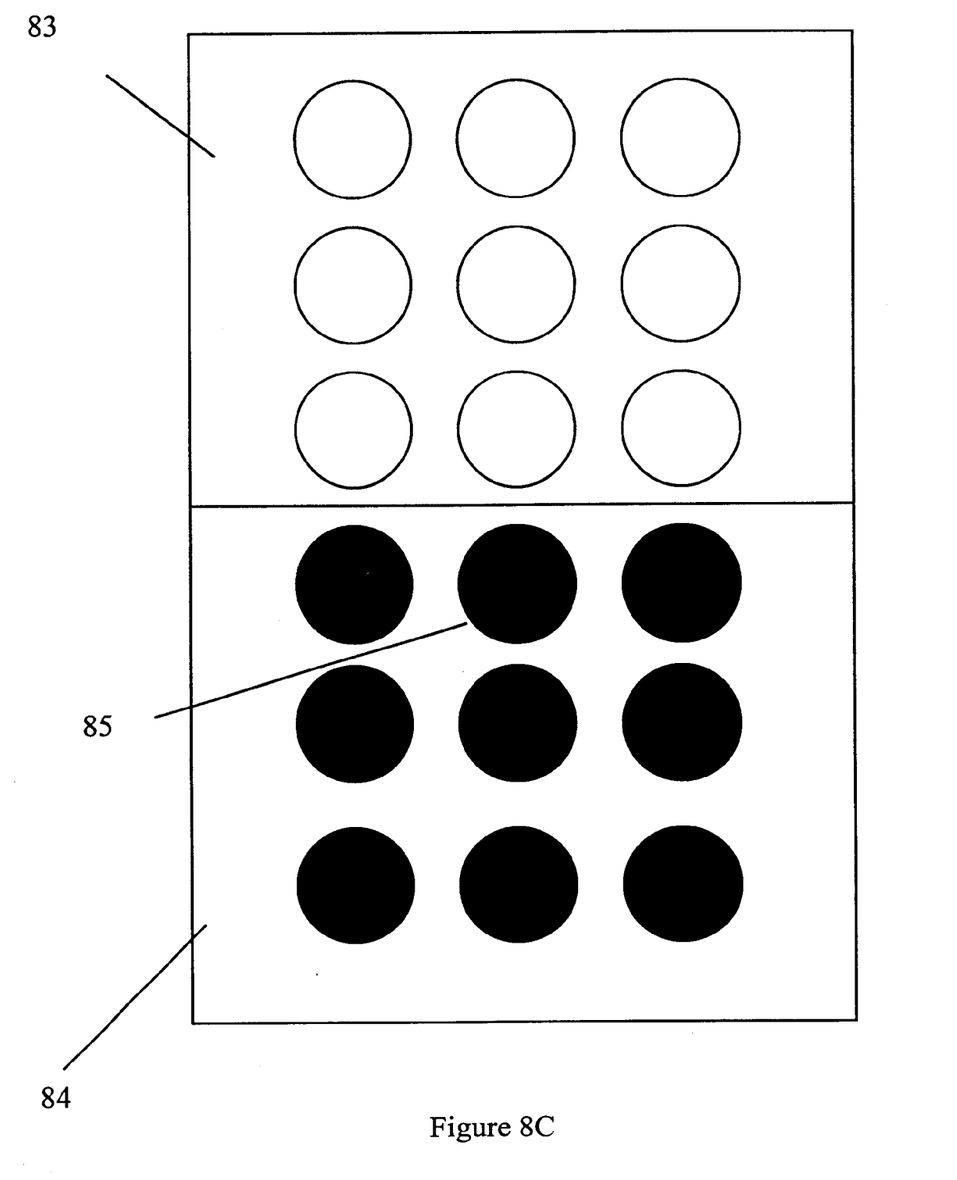
FIG. 8C illustrates a logical grid remaining unchanged due to the value of the border pixel

FIGS. 8A, B and C illustrate the method assigning segment identifiers to pixels that are intermediate in value. One embodiment of a gray pixel is illustrated in FIG. 8A where, pixel 82 has a value closer to the average value of the pixels in subsection 80 than in subsection 81. Hence, as illustrated in FIG. 8B, pixel 82 is assigned to subsection 80 and the shape of subsection 80 is changed as result of the inclusion of pixel 82. In another embodiment, the gray pixel 85 in FIG. 8C, has a value closer to the average value of subsection 84 than that of subsection 83. Hence the segment identifier of pixel 85 is not changed and pixel 85 remains a part of subsection 84.

Figure 9A:
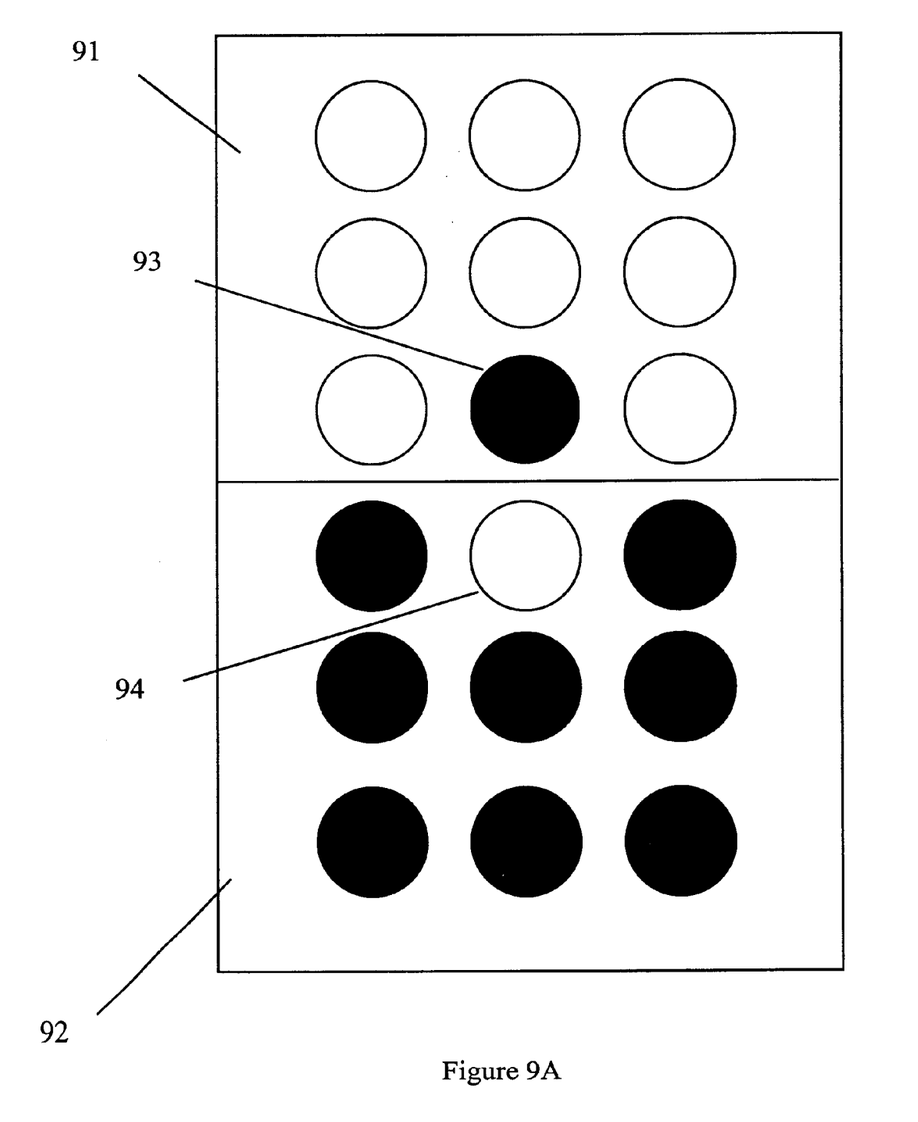
FIG. 9A illustrates an outlier problem.
Figure 9B:
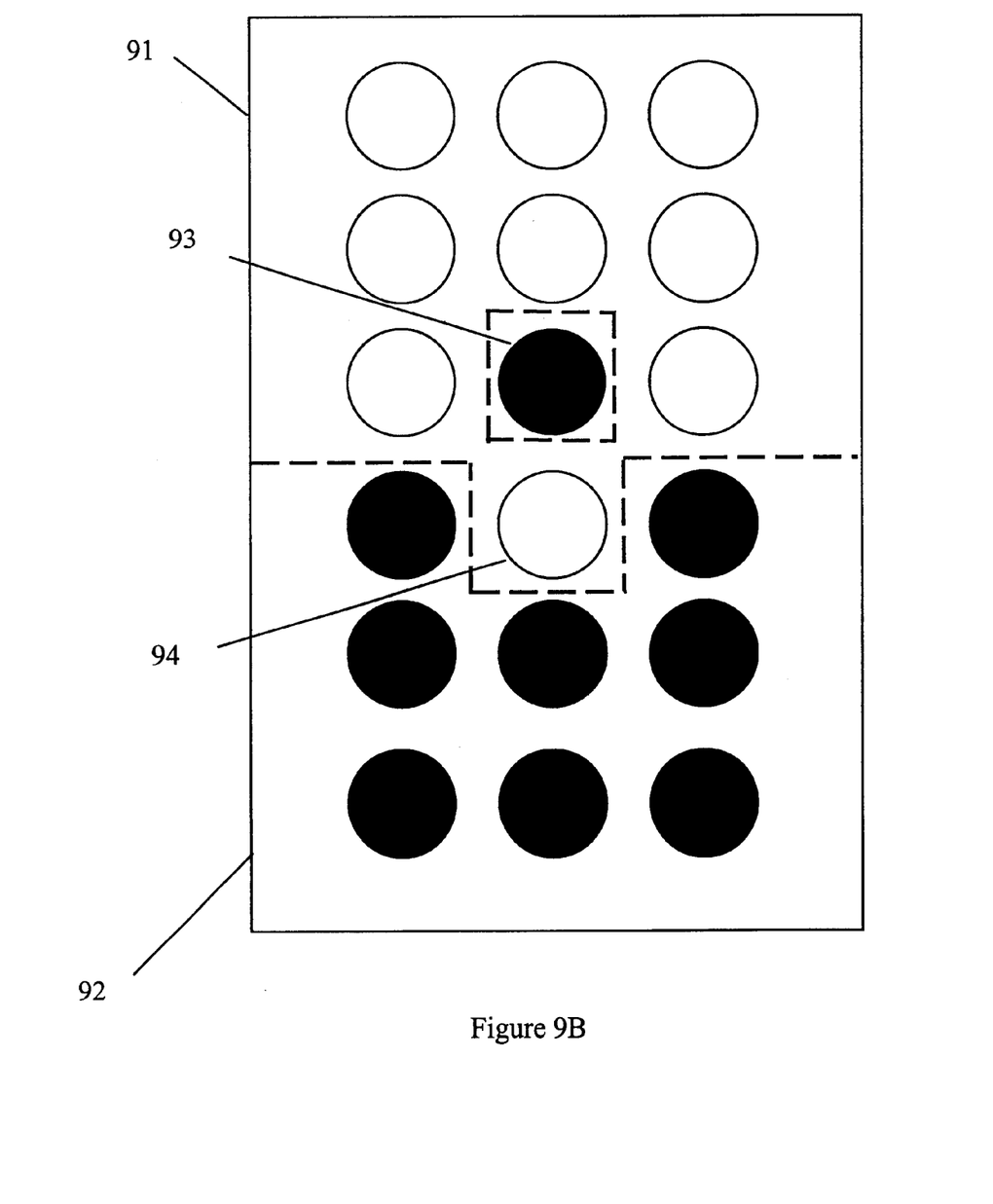
FIG. 9B illustrates one outlier pixel being identified.
Figure 9C:
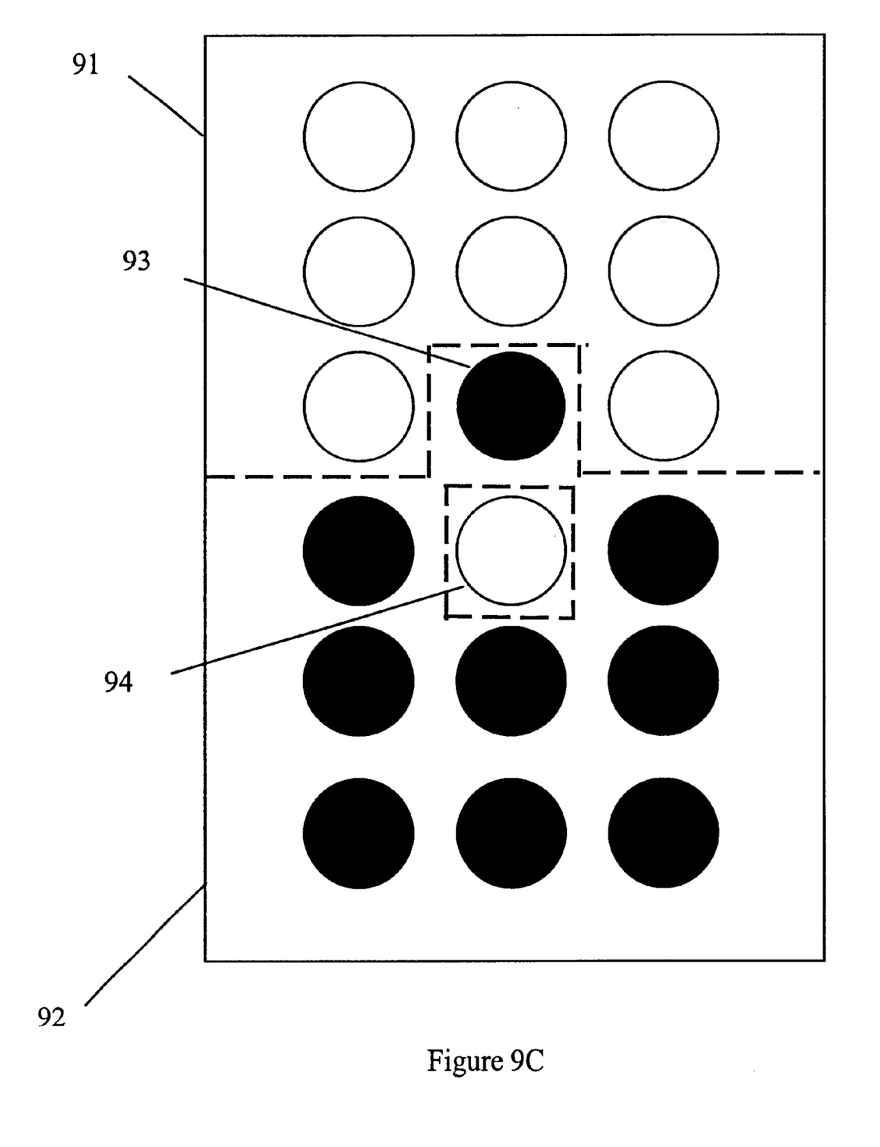
FIG. 9C illustrates an outlier pixel in an adjacent segment being identified.

FIG. 9A illustrates the outlier problem. In this case Pixel 93 has a value close to the average pixel value of segment 92, while Pixel 94 has a value close to the average pixel value of segment 91. In this case pixel 93 is temporarily assigned to subsection 92 as depicted in FIG. 9B. At the same time, pixel 94 is temporarily assigned to subsection 91 as depicted in FIG. 9C. It is important to note that this the segment assignment illustrated in FIGS. 9B and 9C is only temporary and they occur simultaneously.

In one embodiment, an outlier pass is performed subsequent to the temporary segment assignment depicted in FIGS. 9B and C. This process checks for segment boundaries that are not continuous. This is precisely the case that arises in segment 91 and segment 92 where pixel 93 temporarily belongs to subsection 92 although it is not connected to segment 92 and pixel 94 temporarily belongs to subsection 91 although it is not connected to segment 91. Such disconnected segments are not allowable. This step corrects the situation of disconnected segments by reassigning the segment boundaries and returning pixel 93 to segment 91 and pixel 94 to segment 92. Thus the segment assignment illustrated in FIG. 9A is restored.

Figure 10:
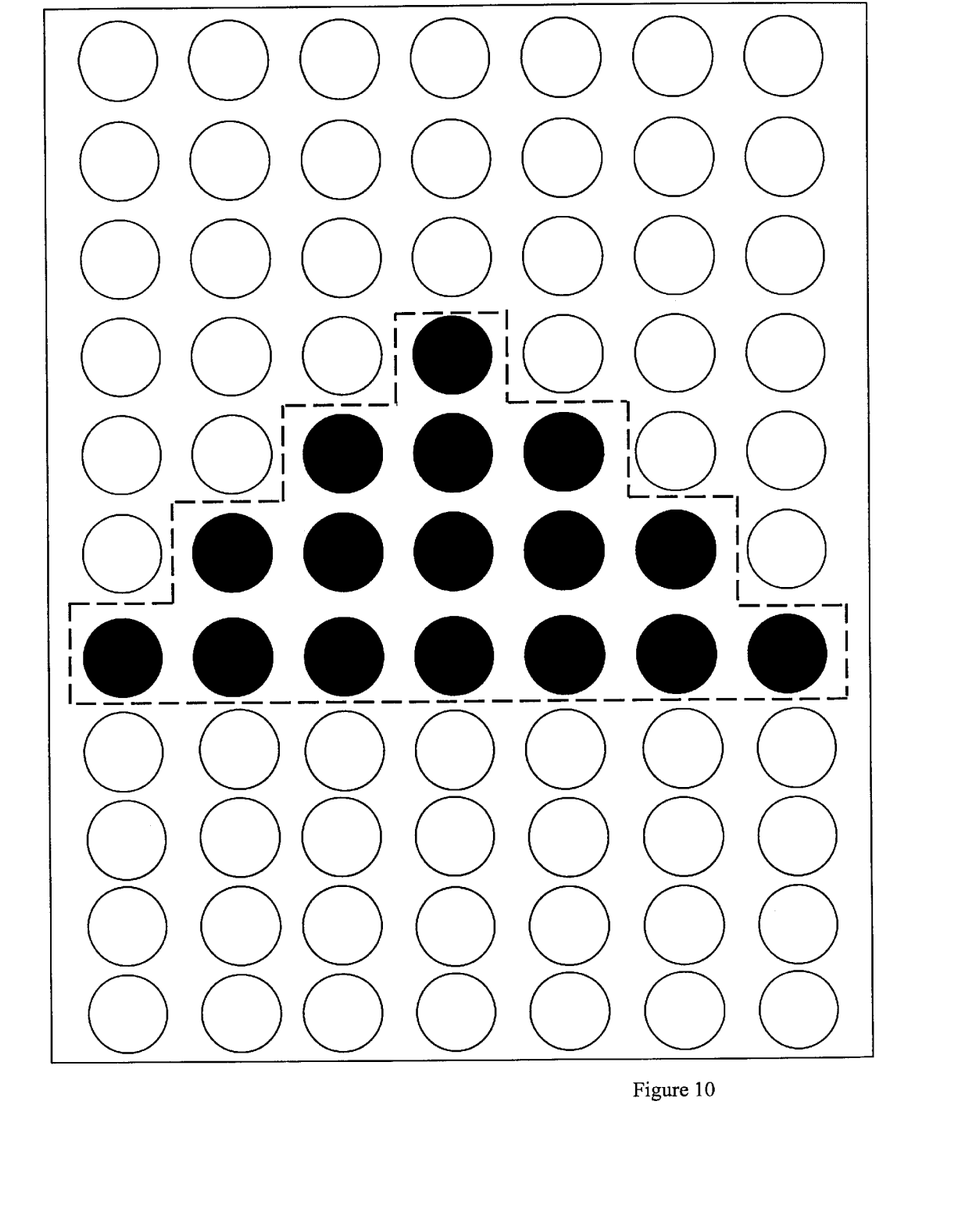
FIG. 10 illustrates a resulting segment identifier map.

FIG. 10 illustrates the resulting segment identifier map from the original image. All of the black pixels are together with a certain segment identifier. The white pixels are in a plurality of subsections. Any outliers have been changed appropriately. In one embodiment, the invention employs a gluing pass to reduce the number of segments by gluing segments of similar pixel value characteristics together.

The above description is illustrative and not restrictive. The scope of the invention should, therefore, be determined not with reference to the above description, but instead should be determined with reference to the appended claims along with their full scope of equivalents.

What is claimed is:

1. A method of dividing a digital image into segments, wherein the digital image comprises an array of pixels each having a pixel location and a pixel color value, the method comprising:

obtaining an image frame comprising an array of pixels each having a pixel color value;

assigning an initial segment identifier to each pixel in the image frame independent of each pixel's pixel color value;

testing, using an appropriateness test, pixels for possible reassignment from a current segment to a neighboring segment; and if the appropriateness test indicates a pixel should be reassigned, reassigning the segment identifier of the pixel.

2. The method of claim 1, further comprising reassigning the pixel color of outlier pixels to the representative color of the immediately adjacent pixels.

3. The method of claim 1, wherein the pixel segment identifier is based upon the pixel's location with a logical grid, the logical grid having a unique segment identifier corresponding initially to a logical grid section.

4. The method of claim 1, wherein reassigning comprises:

obtaining a boundary pixel, wherein a boundary pixel is a pixel located proximate to a pixel having a different segment identifier than that of the boundary pixel;

considering pixel values in a neighborhood adjacent to the boundary pixel;

logically grouping the neighboring pixels by commonality of segment identifiers;

computing a representative color value for each pixel group; and reassigning the segment identifier of the boundary pixel to match the group whose representative color value most closely matches the color of the boundary pixel.

5. The method of claim 1, further comprising repeating the steps of testing and reassigning until the segment boundaries converge such that the testing step results in no possible reassignments.

6. The method of claim 1, further comprising repeating the steps of testing and reassigning until the segment boundaries converge such that the testing step results in less than a threshold amount of reassignment.

7. The method of claim 6, wherein the threshold amount of reassignment is measured as a predetermined number of pixels.

8. A method of dividing a digital image into segments, wherein the digital image comprises an array of pixels each having a pixel location and a pixel color value, the method comprising:

obtaining an image frame comprising an array of pixels each having a pixel color value;

overlaying a logical grid over the image data such that initially each subsection of the grid encompasses at least two pixels; and adjusting the grid subsection boundaries to create at least one segment.

9. The method of claim 8, wherein moving further comprises the steps of:

obtaining a boundary pixel;

considering pixel values in the grid subsections adjacent to and including the boundary pixel;

computing a representative pixel color value for each considered grid subsection; and adjusting the grid subsection boundaries such that the considered boundary pixel is associated with the grid subsection with the closest color value to the boundary pixel's color value.

10. The method of claim 8, the method further comprising reassigning the pixel color of outlier pixels to a representative color of immediately adjacent pixels.

11. The method of claim 8, wherein considering the pixels comprises considering only the pixels within a given neighborhood of the boundary pixel.

* * * * *